United States Patent
Li et al.

(10) Patent No.: US 11,701,600 B2
(45) Date of Patent: Jul. 18, 2023

(54) METHOD FOR CRYSTALLIZATION OF β-AMMONIUM TETRAMOLYBDATE

(71) Applicant: CENTRAL SOUTH UNIVERSITY, Changsha (CN)

(72) Inventors: Jiangtao Li, Changsha (CN); Zhongwei Zhao, Changsha (CN); Zhichao Li, Changsha (CN); Xingyu Chen, Changsha (CN); Xuheng Liu, Changsha (CN); Lihua He, Changsha (CN); Fenglong Sun, Changsha (CN); Yongjin Luo, Changsha (CN); Muye Cui, Changsha (CN)

(73) Assignee: CENTRAL SOUTH UNIVERSITY, Changsha (CN)

( * ) Notice: Subject to any disclaimer, the term of this patent is extended or adjusted under 35 U.S.C. 154(b) by 0 days.

(21) Appl. No.: 17/992,949

(22) Filed: Nov. 23, 2022

(65) Prior Publication Data
US 2023/0158424 A1    May 25, 2023

(30) Foreign Application Priority Data
Nov. 23, 2021   (CN) .......................... 202111396089.4

(51) Int. Cl.
*B01D 9/00*  (2006.01)
*C01G 39/00*  (2006.01)

(52) U.S. Cl.
CPC ........... *B01D 9/0063* (2013.01); *B01D 9/005* (2013.01); *C01G 39/006* (2013.01); *B01D 2009/0086* (2013.01); *C01P 2002/72* (2013.01); *C01P 2004/03* (2013.01)

(58) Field of Classification Search
CPC ........ B01D 9/00; B01D 9/0063; B01D 9/005; B01D 2009/0086; C01G 39/006; C01P 2002/72; C01P 2004/03

USPC ....................................... 423/593.1
See application file for complete search history.

(56) References Cited

FOREIGN PATENT DOCUMENTS

| CN | 102502844 A | 6/2012 |
| CN | 102583542 A | 7/2012 |
| CN | 103408071 A | 11/2013 |
| CN | 208013008 U | 10/2018 |
| CN | 209393171 U | 9/2019 |
| CN | 112607777 A | 4/2021 |
| CN | 112875753 A | 6/2021 |
| CN | 113463179 A | 10/2021 |

OTHER PUBLICATIONS

Wu Zheng-Ping, et al., Mechanism of Ultrasonic Effect on the Crystallazition of Ammonium Molybdate in Aqueous Solution, The Chinese Journal of Process Engineering, 2002, pp. 26-31, vol. 2, No. 1.
J. Neugebauer, et al., Ammonium Molybdate for Powder Metallurgy, 1989, pp. 30-35.

*Primary Examiner* — Edward M Johnson
(74) *Attorney, Agent, or Firm* — Bayramoglu Law Offices LLC (57) ABSTRACT

A method for crystallization of β-ammonium tetramolybdate includes: performing a stepwise pH-adjusting treatment of an ammonium molybdate solution via zoning to obtain the β-ammonium tetramolybdate. When feeding the ammonium molybdate solution into a reaction system from a first zone and then into second to sixth zones successively, $pH^1$ of a resultant solution in the first zone is 7.0-6.0; $pH^2$ of a resultant solution in the second zone is less than 6 and greater than or equal to 4; $pH^3$ of a resultant solution in the third zone is less than 4 and greater than or equal to 2.5; $pH^4$ of a crystallized slurry in the fourth zone is less than 2.5 and greater than or equal to 1; $pH^5$ of a crystallized slurry in the fifth zone is 2.5-4.0; and $pH^6$ of a crystallized slurry in the sixth zone is less than 2.5 and greater than or equal to 2.0.

20 Claims, 4 Drawing Sheets

METHOD FOR CRYSTALLIZATION OF β-AMMONIUM TETRAMOLYBDATE

CROSS REFERENCE TO THE RELATED APPLICATIONS

This application is based upon and claims priority to Chinese Patent Application No. 202111396089.4, filed on Nov. 23, 2011, the entire contents of which are incorporated herein by reference.

TECHNICAL FIELD

The present invention relates to the field of rare metal material preparation, and specifically, to a method for preparing β-ammonium tetramolybdate by continuous crystallization.

BACKGROUND

Molybdenum, a significant strategic rare metal, is widely used in the steel industry, metal pressure processing, aerospace, petrochemical industry, and other fields, and is listed as a strategic reserve resource by many countries. China is a major producer and consumer of molybdenum resources. With the continuous development of science and technology, China's requirements for molybdenum-related industries have also been raised to a new strategic level. Ammonium tetramolybdate, as a significant intermediate produced by molybdenum smelters, is a main raw material of the deep-processed molybdenum products such as molybdenum powder and bars. The crystal form, morphology, aggregation state, thermostability, purity, and other factors of ammonium tetramolybdate products will directly affect the yield, sintering performance, strength and toughness, and other indicators of subsequent deep-processed molybdenum products.

Ammonium tetramolybdate mainly has two crystal forms: α and β, with the same molecular formula of $(NH_4)_2Mo_4O_{13}$, but distinct difference in the thermal decomposition characteristics and other properties. α-ammonium tetramolybdate has uneven grain sizes and poor thermostability, resulting in low yield of molybdenum bars. β-ammonium tetramolybdate is an ideal crystal form with a bulky and uniform crystal structure and excellent thermostability (no intermediate compounds are formed during thermal evolution). The molybdenum bars produced by reduction from β-ammonium tetramolybdate as a raw material have significantly increased yield and processing performance. β-ammonium tetramolybdate has now become a predominant raw material for deep processing as molybdenum. However, most of the ammonium tetramolybdate products of major manufacturers in China are mixtures of several crystal forms based on α-ammonium tetramolybdate. Therefore, it is of great significance to develop and prepare high-purity β-ammonium tetramolybdate for improving the quality of deep-processed molybdenum products.

During crystallization of ammonium tetramolybdate by acid precipitation, polymerization of molybdate ions is significantly affected by macroscopic factors of the solution (ion concentration of main components of the solution, system temperature, and pH of the solution), resulting in variable polymerization morphology; and rapid crystallization reaction occurs, leading to cocrystallization of various ammonium molybdates. Even for the crystallization of the same ammonium tetramolybdate, there is also a transformation process between different crystal forms, so that the quality of products fluctuates greatly. Due to the interaction of these factors, the crystallization is more complex, and it is particularly difficult to pursue a single crystallization environment of β-ammonium tetramolybdate and to ensure the stability of product quality.

At present, industrial β-ammonium tetramolybdate is mainly prepared by directly putting an ammonium tetramolybdate product obtained through crystallization by acid precipitation into a plastic bag without drying, sealing the bag at an opening, and then leaving it in a drying chamber at 40° C. for 24-48 h, to promote the transformation to β-ammonium tetramolybdate. This technique has such disadvantages as long production cycle, low production efficiency, high energy consumption, large occupied area of equipment and large investment, and being prone to agglomeration for products. In order to promote the transformation to β-ammonium tetramolybdate, Wu Zhengping et al. (Wu Zhengping, Yin Zhoulan, Chen Qiyuan, Zhang Pingmin, Li Jie. Mechanism of Ultrasonic Effect on the Crystallization of Ammonium Molybdate in Aqueous Solution. The Chinese Journal of Process Engineering, 2002, 2(1):26-31) introduced an ultrasonic field during crystallization of ammonium tetramolybdate by acid precipitation. Under the ultrasonic effect, β-ammonium tetramolybdate in turn underwent a new crystal form transformation, leading to micronized ammonium tetramolybdate. This method is in favor of the control of crystal morphology, but is still difficult in fine control of the crystal form transformation, and the purity of obtained β-ammonium tetramolybdate needs to be improved. Xu Shuang et al. (CN 102502844 A) invented a method and system for production of β-ammonium tetramolybdate, by direct addition of its raw material without drying into a weakly acidic hot water system, with stirring, heating, and thermal insulation, for transformation into β-ammonium tetramolybdate. This method has low energy consumption and low investment cost, but high requirements for reaction equipment and conditions, with cumbersome experimental process. R W Stanley (J. Neugebauer, et al. Ammonium Molybdate for Powder Metallurgy. China Molybdenum Industry, 1989, (2):30-35.) leached out industrial-grade molybdenum oxide and removed a residue, acidified an ammonium molybdate solution to pH 1.5-2.5 at 75° C., successfully providing ammonium tetramolybdate in a new form characterized by XRD as an important intermediate in the production of pure molybdenum oxide and high-quality molybdenum metal powder, without reference to the crystal structure of this product. In recent years, researchers have paid more attention to the development of equipment for acid precipitation of β-ammonium tetramolybdate, intending to prepare a high-quality β-ammonium tetramolybdate product by finely regulating crystallization conditions through the equipment. For example, the timing of acid addition was accurately controlled by designing an automatic acid precipitation device (ZL 201821793289.7), and the composition change and crystallization state of a solution were accurately observed by designing an automatic system for testing a proportion of ammonium molybdate to control the transformation of ammonium tetramolybdate in the solution (ZL 201820292451.0). The above series of designs can improve the automation and intelligence of production of ammonium tetramolybdate, and increase the proportion of β-ammonium tetramolybdate in ammonium tetramolybdate crystals. However, there is still room for improvement in the yield and purity of β-ammonium tetramolybdate in the related art.

SUMMARY

In view of deficiencies in the existing technical solutions, a first objective of the present invention is to provide a method for crystallization of β-ammonium tetramolybdate, so as to efficiently and continuously prepare β-ammonium tetramolybdate with high crystallinity and high purity.

The method for crystallization of β-ammonium tetramolybdate includes: stepwise pH-adjusting treatment of an ammonium molybdate solution via zoning, where upon feeding the ammonium molybdate solution into a reaction system from a first zone, $pH^1$ of a resultant solution in the first zone is adjusted to 7.0-6.0, prior to discharge into a second zone; $pH^2$ of a resultant solution in the second zone is adjusted to be less than 6 and greater than or equal to 4, prior to discharge into a third zone; $pH^3$ of a resultant solution in the third zone is adjusted to be less than 4 and greater than or equal to 2.5, prior to discharge into a fourth zone; $pH^4$ of a crystallized slurry in the fourth zone is adjusted to be less than 2.5 and greater than or equal to 1, prior to discharge into a fifth zone; $pH^5$ of a crystallized slurry in the fifth zone is adjusted to 2.5-4.0, prior to discharge into a sixth zone; and $pH^6$ of a crystallized slurry in the sixth zone is adjusted to be less than 2.5 and greater than or equal to 2.0, prior to reflux of a portion of the slurry to the third zone, with the remains fed into a product zone for solid-liquid separation, to obtain β-ammonium tetramolybdate.

By the present invention, it is discovered that treatment of the ammonium molybdate solution via six zones as required, in combination with pH control at each zone, can produce a synergistic effect, and can effectively reduce impurity phases and improve the purity and crystallinity of the resulted β-ammonium tetramolybdate. In the present invention, proper partition into an ammonium molybdate nucleation stage, a crystal growth stage and a crystal form transformation stage, and oriented regulation and organic tandem are in favor of the stability and homogeneity of components in the solution at each stage, leading to stable and continuous preparation of β-ammonium tetramolybdate.

In the present invention, the zoning setup and the joint control of pH parameters at an endpoint of each zone are key to synergistically improving the purity and crystallinity of β-ammonium tetramolybdate. In the present invention, the pH gradient control is carried out as required at the first zone to the fourth zone, and pH is adjusted back at the fifth zone and then further reduced at the sixth zone. It is found that by using such mechanism for controlling pH via zoning, the purity and crystallinity of β-ammonium tetramolybdate can be unexpectedly improved. It is also found that the further joint control of pH at different zones helps further improve the purity and crystallinity of β-ammonium tetramolybdate.

Preferably, $pH^1$ is 6-7, further preferably 6.3-7.
Preferably, $pH^2$ is 4.0-5.9.
Preferably, $pH^3$ is 2.5-3.9, further preferably 3-3.9.
Preferably, $pH^4$ is 1.0-2.4, further preferably 1.5-2.4.
Preferably, $pH^5$ is 2.5-4.0, further preferably 3.8-4.0.
Preferably, $pH^6$ is 2.0-2.4.

In the present invention, the concentration of the ammonium molybdate solution is not specifically required. Considering the economic efficiency of preparation, a concentration of the ammonium molybdate solution is 50-200 g/L.

In the present invention, an acid used in pH adjustment at each zone is at least one of aqueous hydrochloric acid and nitric acid.

Preferably, the concentration of the acid used in pH adjustment at each zone is not specifically required. Considering the economic efficiency of preparation, a concentration may be 5-10 mol/L.

In the present invention, an alkali used in pH adjustment is aqueous ammonia.

In the present invention, a temperature of the solution during treatment at each zone is 60-90° C.

In the present invention, the residence time at each zone is not specifically limited. As long as pH at an endpoint satisfies the required condition, the solution can be transferred to a next zone for reaction. Considering the economic efficiency of preparation, a total residence time of a solution may be 2-6 h.

In the present invention, part of the slurry with pH adjusted at the sixth zone is refluxed to the third zone. Preferably, a reflux ratio is 5-20 v %.

According to the technical solution of the present invention, the ammonium molybdate solution is continuously added to the first zone and is continuously subjected to stepwise pH-adjusting treatment via zoning, to provide β-ammonium tetramolybdate at the product zone. In the present invention, β-ammonium tetramolybdate can be continuously and efficiently prepared.

In the present invention, the solution can be transferred to a next zone by an existing method.

In the present invention, the reaction can be carried out by using zonal reaction devices in series or a ring-shaped device. Considering the economic efficiency of production, a ring-shaped device is preferably used. The ring-shaped device includes, for example, an outer reaction cylinder and an inner reaction cylinder. The outer reaction cylinder and the inner reaction cylinder form a ring-shaped reaction chamber. Five plates are circumferentially arranged (uniformly) in the ring-shaped reaction chamber to divide the ring-shaped reaction chamber into six reaction zones from the first zone to the sixth zone. A device or equipment for solution flow and transfer (such as overflow holes and underflow holes provided on the plates, or pumps) is provided at each reaction zone. A stirring device is provided at each reaction zone. The ammonium molybdate solution is added to the first zone with $pH^1$ adjusted and then transferred to the second zone, a solution in the second zone with $pH^2$ adjusted is then transferred to the third zone, a solution in the third zone with $pH^3$ adjusted is then transferred to the fourth zone, a solution in the fourth zone with $pH^4$ adjusted is then transferred to the fifth zone, a solution in the fifth zone with $pH^5$ adjusted is then transferred to the sixth zone, a solution in the sixth zone with $pH^6$ adjusted is then transferred to the cylinder chamber (product zone), and a solution is drawn from the cylinder chamber for solid-liquid separation, to obtain the product. Part of the solution in the inner cylinder chamber is refluxed to the third zone.

According to a preferred method for preparing β-ammonium tetramolybdate by continuous crystallization in the present invention, an ammonium molybdate solution and an acid solution are respectively added to a first zone (neutralization zone) and fully mixed to control $pH^1$ to be 7.0-6.0 to obtain a mixed solution; the mixed solution moves to a second zone (polymerization zone), and the acid solution is continuously added to this zone to control $pH^2$ to be less than 6 and greater than or equal to 4 to obtain a solution; the solution continuously moves to a third zone (ammonium tetramolybdate crystallization zone), and the acid solution is continuously added to this zone to control $pH^3$ to be less than 4 and greater than or equal to 2.5 to obtain a crystallized slurry; after the crystallized slurry moves to a fourth zone, the acid solution is further added to reduce $pH^4$ to be less than 2.5 and greater than or equal to 1 to obtain a crystallized slurry; after the crystallized slurry continuously moves to a fifth zone (fine grain redissolving zone), aqueous ammonia is added to adjust $pH^5$ back to be greater than 2.5 and less than or equal to 4 to obtain a crystallized slurry; after the crystallized slurry continuously moves to a sixth zone (ammonium tetramolybdate crystal growth zone), the acid solution is added to adjust $pH^6$ to be less than 2.5 and greater than or equal to 2 to obtain a reaction slurry; the reaction slurry flows into a central reaction zone (inner cylinder chamber) because the sixth zone is in communication with the central reaction zone at the bottom; a baffle is directly mounted between the central reaction zone and the third zone, and the baffle is adjusted in height to control the flow rate of the slurry back to the third zone as the supply of a seed solution; the solution after reaction at the central reaction zone is pumped from the top and then filtered to obtain β-ammonium tetramolybdate crystals.

Beneficial Effects

1. In the present invention, the neutralization, polymerization, nucleation, crystal growth, fine grain redissolving, and seed addition during the crystallization of ammonium molybdate by acid precipitation are properly partitioned and organically combined, thereby achieving continuous and stable crystallization control of ammonium molybdate.

2. In the present invention, through the stepwise pH-adjusting treatment via zoning and the joint control of pH adjustment mechanism and parameter condition, a synergistic effect can be achieved, facilitating the stability of solution composition during crystallization, and β-ammonium tetramolybdate with uniform morphology is obtained.

3. In the present invention, the equipment is compact, the occupied area is small, the thermal radiation loss is small, the power connection is less, and it is beneficial to automated fine operations and continuous production, resulting in high production efficiency and low energy consumption.

DETAILED DESCRIPTION OF THE EMBODIMENTS

The present invention is further described below with reference to examples. The following examples are used to further illustrate the present invention, but not to further limit the present invention.

Example 1

An ammonium molybdate solution used herein has a concentration of 121.5 g/L and pH of 9.8. The ammonium molybdate solution and 5 mol/L nitric acid solution were added into a first zone respectively, with the solution pH at this zone controlled to be 6.2, to obtain a mixed solution. The mixed solution flowed in the form of overflow and underflow in the direction of second zone→third zone-→fourth zone→fifth zone→sixth zone→product collection zone. A 5 mol/L nitric acid solution was added into the second zone (polymerization zone) to control the solution pH at this zone to be 4.8. A 5 mol/L nitric acid solution was added into the third zone (ammonium tetramolybdate crystallization zone) to control the solution pH at this zone to be 2.8. A 5 mol/L nitric acid solution was added into the fourth zone (nucleation zone) to control the solution pH at this zone to be 1.2. A 6 mol/L aqueous ammonia was added into the fifth zone (fine grain redissolving zone) to control the solution pH at this zone to be 3.8. A 5 mol/L nitric acid solution was added into the sixth zone (ammonium tetramolybdate crystal growth zone) to control the solution pH at this zone to be 2.3. The resultant solution flowed into the product collection zone, and the proportion of the solution refluxed from the product collection zone to the third zone was controlled to be 10%. The remaining solution was pumped from the top and then filtered to obtain β-ammonium tetramolybdate crystals. The temperature of the whole system was controlled to be 80° C., the total residence time was 5 h, and the crystallinity was 91.2%. The obtained ammonium tetramolybdate crystal sample was analyzed and detected to obtain the XRD pattern and SEM image shown in FIG. 1 and FIGS. 2A-2B, respectively.

Figure 1:
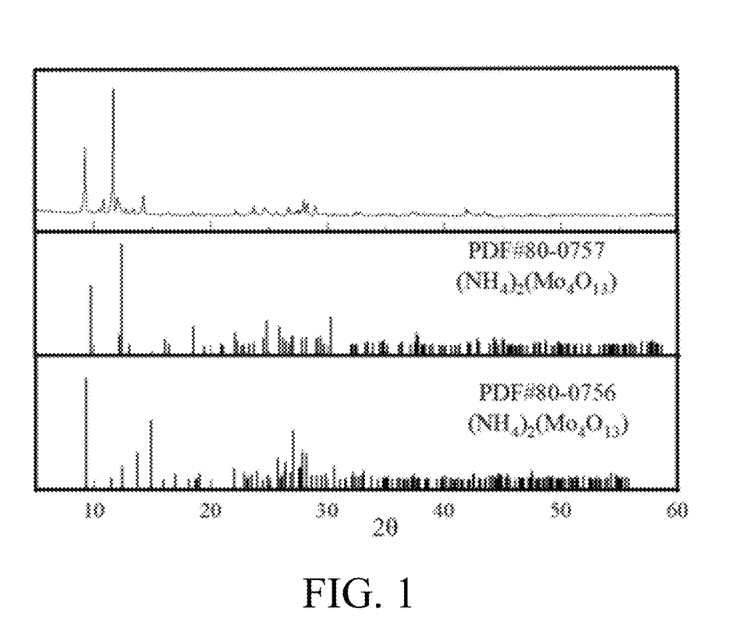
FIG. 1 is an XRD pattern of β-ammonium tetramolybdate crystals prepared in Example 1.

It can be seen from the XRD pattern that the composition of the sample mainly includes β-ammonium tetramolybdate, with a small amount of α-ammonium tetramolybdate. By analysis, β-ammonium tetramolybdate accounts for 84.4%, and α-ammonium tetramolybdate only accounts for 15.6%. Compared with the conventional crystallization by direct acid precipitation, this example not only resolves the problem that ammonium polymolybdate is prone to be produced during crystallization, but also obtains high-purity ammonium tetramolybdate that mainly contains β-ammonium tetramolybdate accounting for up to 84%, which lays a good foundation for later processing of molybdenum materials.

Figure 2A:
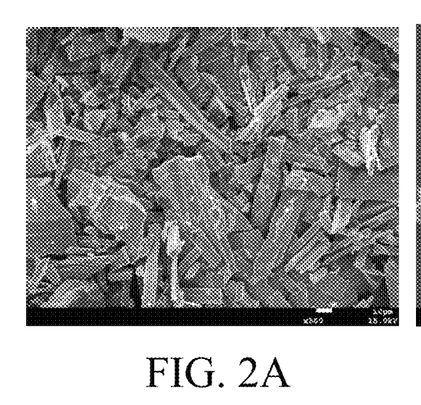
FIGS. 2A-2B are SEM images of β-ammonium tetramolybdate crystals prepared in Example 1.
Figure 2B:
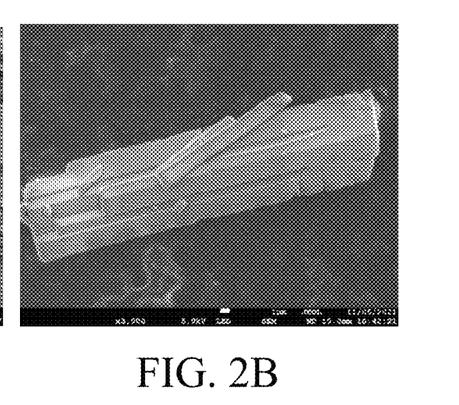

It can be seen from the SEM image of the crystallized product that β-ammonium tetramolybdate is mainly in a regular long-strip shape, with a clear crystal boundary, uniform distribution in whole, and is almost formed by accumulation of thin and long particles, with a high purity of crystal form structure, which is very suitable as a raw material for production of molybdenum bars and wires by reduction processing.

Example 2

An ammonium molybdate solution used herein has a concentration of 121.5 g/L and pH of 9.8. The ammonium molybdate solution and 6 mol/L nitric acid solution were added into a first zone respectively, with the solution pH at this zone controlled to be 7.0, to obtain a mixed solution. The mixed solution flowed in the form of overflow and underflow in the direction of second zone→third zone-→fourth zone→fifth zone→sixth zone→central reaction zone. A 6 mol/L nitric acid solution was added into the second zone (polymerization zone) to control the solution pH at this zone to be 5.9. A 6 mol/L nitric acid solution was added into the third zone (ammonium tetramolybdate crystallization zone) to control the solution pH at this zone to be 3.9. A 6 mol/L nitric acid solution was added into the fourth zone (nucleation zone) to control the solution pH at this zone to be 2.4. A 6 mol/L aqueous ammonia was added into the fifth zone (fine grain redissolving zone) to control the solution pH at this zone to be 4.0. A 6 mol/L nitric acid solution was added into the sixth zone (ammonium tetramolybdate crystal growth zone) to control the solution pH at this zone to be 2.4. The resultant solution flowed into the central reaction zone, and the proportion of the solution refluxed from the product collection zone to the third zone was controlled to be 8%. The remaining solution was pumped from the top and then filtered to obtain β-ammonium tetramolybdate crystals. The temperature of the whole system was controlled to be 60° C., the total residence time was 4 h, and the crystallinity was 94.6%. β-ammonium tetramolybdate accounts for 83.6% of the product.

Example 3

An ammonium molybdate solution used herein has a concentration of 82.1 g/L and pH of 9.5. The ammonium molybdate solution and 10 mol/L nitric acid solution were added into a first zone respectively, with the solution pH at this zone controlled to be 6.3, to obtain a mixed solution. The mixed solution flowed in the form of overflow and underflow in the direction of second zone→third zone-→fourth zone→fifth zone→sixth zone→central reaction zone. A 10 mol/L nitric acid solution was added into the second zone (polymerization zone) to control the solution pH at this zone to be 4.0. A 10 mol/L nitric acid solution was added into the third zone (ammonium tetramolybdate crystallization zone) to control the solution pH at this zone to be 3.0. A 10 mol/L nitric acid solution was added into the fourth zone (nucleation zone) to control the solution pH at this zone to be 1.5. A 6 mol/L aqueous ammonia was added into the fifth zone (fine grain redissolving zone) to control the solution pH at this zone to be 4.0. A 10 mol/L nitric acid solution was added into the sixth zone (ammonium tetramolybdate crystal growth zone) to control the solution pH at this zone to be 2.0. The resultant solution flowed into the central reaction zone, and the proportion of the solution refluxed from the product collection zone to the third zone was controlled to be 12%. The remaining solution was pumped from the top and then filtered to obtain β-ammonium tetramolybdate crystals. The temperature of the whole system was controlled to be 80° C., the total residence time was 6 h, and the crystallinity was 93.6%. β-ammonium tetramolybdate accounts for 84.2% of the product.

Example 4

An ammonium molybdate solution used herein has a concentration of 82.1 g/L and pH of 9.5. The ammonium molybdate solution and 5 mol/L nitric acid solution were added into a first zone respectively, with the solution pH at this zone controlled to be 6.0, to obtain a mixed solution. The mixed solution flowed in the form of overflow and underflow in the direction of second zone→third zone-→fourth zone→fifth zone→sixth zone→central reaction zone. A 5 mol/L nitric acid solution was added into the second zone (polymerization zone) to control the solution pH at this zone to be 4.6. A 5 mol/L nitric acid solution was added into the third zone (ammonium tetramolybdate crystallization zone) to control the solution pH at this zone to be 2.5. A 5 mol/L nitric acid solution was added into the fourth zone (nucleation zone) to control the solution pH at this zone to be 1.0. A 6 mol/L aqueous ammonia was added into the fifth zone (fine grain redissolving zone) to control the solution pH at this zone to be 3.9. A 5 mol/L nitric acid solution was added into the sixth zone (ammonium tetramolybdate crystal growth zone) to control the solution pH at this zone to be 2.0. The resultant solution flowed into the central reaction zone, and the proportion of the solution refluxed from the product collection zone to the third zone was controlled to be 20%. The remaining solution was pumped from the top and then filtered to obtain β-ammonium tetramolybdate crystals. The temperature of the whole system was controlled to be 70° C., the total residence time was 2 h, and the crystallinity was 92.4%. β-ammonium tetramolybdate accounts for 83.9% of the product.

Comparative Example 1

Compared with Example 1, the difference mainly lies in that there was no treatment at multiple zones. The details are shown as follows.

1 L of ammonium molybdate solution was measured out (same as Example 1). The ammonium molybdate solution was added into a 3 L beaker and stirred in a water bath at 80° C. Then, a 5 mol/L nitric acid solution was gradually added into the ammonium molybdate solution to adjust the solution pH to 2.3, maintained at this temperature for 5 h, and then filtered. The resultant crystallinity was 91.6%. The obtained ammonium tetramolybdate crystal sample was analyzed and detected to obtain the XRD pattern and SEM image shown in FIG. 3 and FIGS. 4A-4B, respectively.

Figure 3:
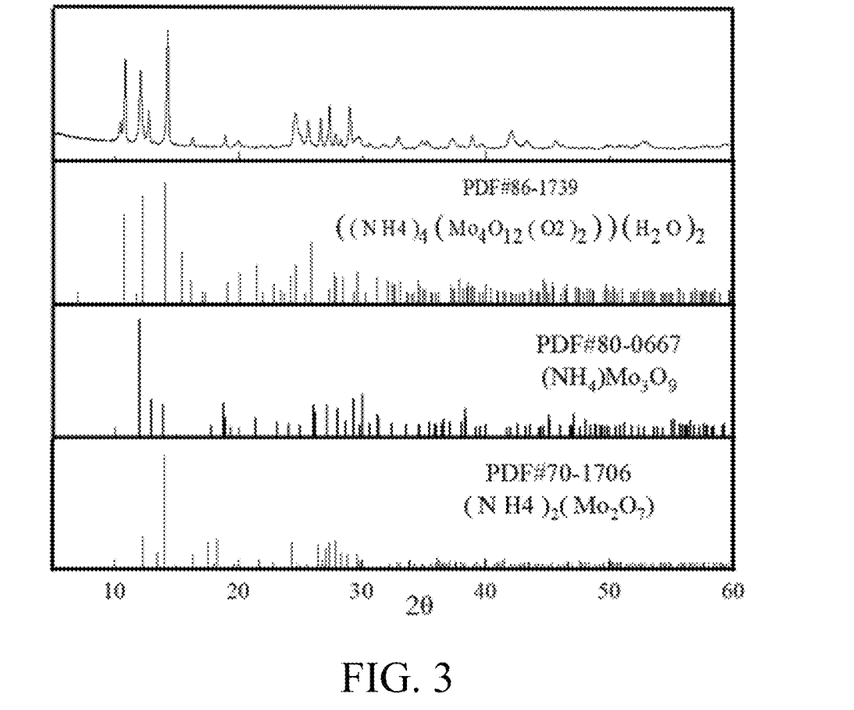
FIG. 3 is an XRD pattern of crystals prepared in Comparative Example 1.
Figure 4A:
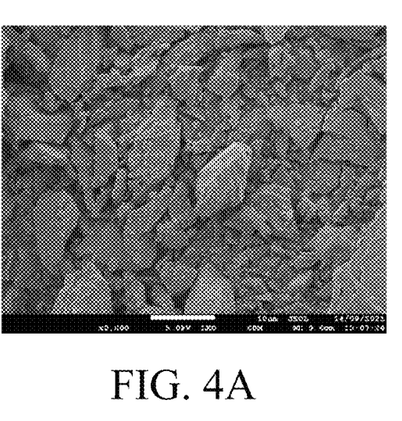
FIGS. 4A-4B are SEM patterns of crystals prepared in Comparative Example 1.
Figure 4B:
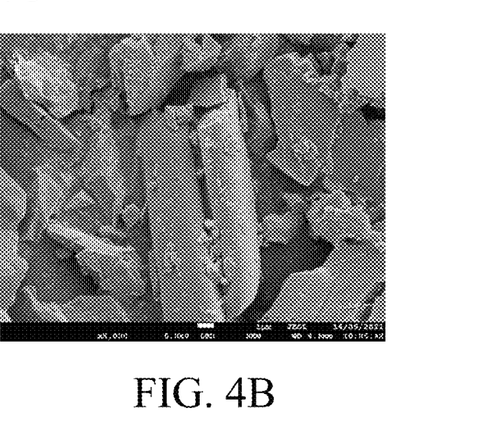

FIG. 3 is an XRD pattern of the crystallized product by direct acid precipitation. It can be seen from this figure that the product contains most ammonium tetramolybdate, some ammonium dimolybdate, and a small amount of ammonium trimolybdate. By analysis, ammonium tetramolybdate accounts for about 73%, ammonium dimolybdate accounts for 21.7%, and ammonium trimolybdate accounts for 5.3%. β-ammonium tetramolybdate accounts for 34.8% of the ammonium tetramolybdate, indicating that the product has a poor purity. FIG. 4 is an SEM image of the crystallized product. It can be seen from this figure that the product is formed by irregular bulk particles having a diameter of about 1-50 μm, with a clear crystal boundary, uneven distribution in whole. This may be because during the crystallization by acid precipitation, the growth direction of the crystal has been shifted with the change of the pH value of the solution, resulting in growth of the crystal on a plurality of crystalline surfaces. In addition, without a fine grain redissolving stage, some ungrown grains are mixed in the product, resulting in uneven distribution in grain size.

Comparative Example 2

Compared with Example 1, the difference mainly lies in that there was no treatment of reflux. The details are shown as follows.

An ammonium molybdate solution was used (same as Example 1). The ammonium molybdate solution and 5 mol/L nitric acid solution were added into a first zone respectively, with the solution pH at this zone controlled to be 6.2, to obtain a mixed solution. The mixed solution flowed in the form of overflow and underflow in the direction of second zone→third zone→fourth zone→fifth zone-→sixth zone→product collection zone. A 5 mol/L nitric acid solution was added into the second zone (polymerization zone) to control the solution pH at this zone to be 4.8. A 5 mol/L nitric acid solution was added into the third zone (ammonium tetramolybdate crystallization zone) to control the solution pH at this zone to be 2.8. A 5 mol/L nitric acid solution was added into the fourth zone (nucleation zone) to control the solution pH at this zone to be 1.2. A 6 mol/L aqueous ammonia was added into the fifth zone (fine grain redissolving zone) to control the solution pH at this zone to be 3.8. A 5 mol/L nitric acid solution was added into the sixth zone (ammonium tetramolybdate crystal growth zone) to control the solution pH at this zone to be 2.3. The resultant solution flowed into the product collection zone and was pumped from the top and then filtered to obtain β-ammonium tetramolybdate crystals. The temperature of the whole system was controlled to be 80° C., the total residence time was 5 h, and the crystallinity was 90.5%. The obtained XRD pattern and SEM image of the ammonium tetramolybdate crystals were shown in FIG. 5 and FIGS. 6A-6B, respectively.

Figure 5:
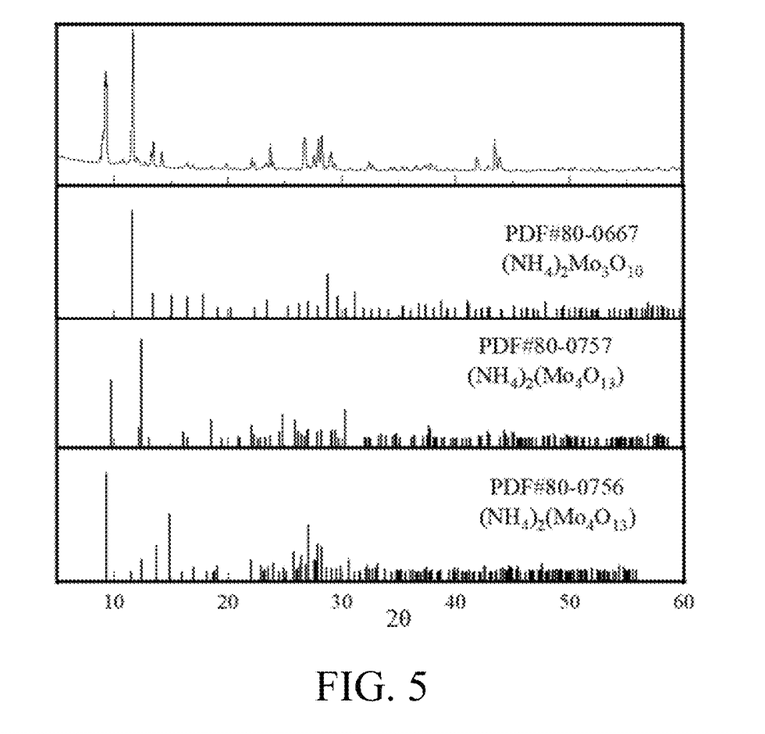
FIG. 5 is an XRD pattern of crystals prepared in Comparative Example 2.
Figure 6A:
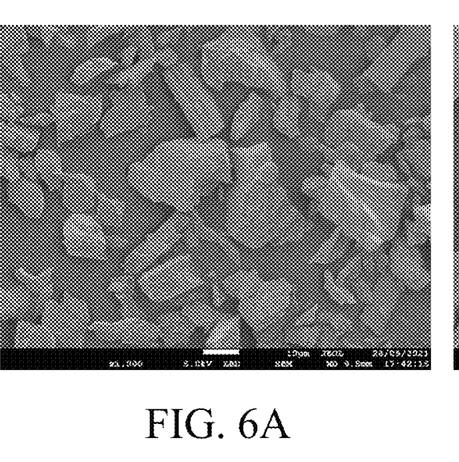
FIGS. 6A-6B are SEM patterns of crystals prepared in Comparative Example 2.
Figure 6B:
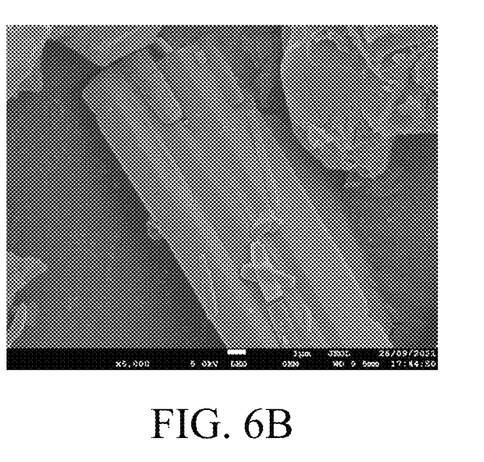

FIG. 5 is an XRD pattern of the crystallized product prepared without slurry reflux (seed addition) during acid precipitation. It can be seen from the XRD pattern that the product contains most α-ammonium tetramolybdate, and some β-ammonium molybdate and ammonium trimolybdate. By analysis, α-ammonium tetramolybdate accounts for about 62.8%, β-ammonium molybdate accounts for 23.6%, and ammonium trimolybdate accounts for 13.6%. FIGS. 6A-6B are SEM images of the crystallized product. It can be seen from this figure that the product is formed by irregular bulk particles with a small amount of long-strip particles, having a diameter of about 1-20 μm, with a clear crystal boundary, widely distributed in particle size.

Comparative Example 3

Compared with Example 1, the difference mainly lies in that there was no adjustment at a fifth zone and a sixth zone. The details are shown as follows.

An ammonium molybdate solution was used (same as Example 1). The ammonium molybdate solution and 5 mol/L nitric acid solution were added into a first zone respectively, with the solution pH at this zone controlled to be 6.2, to obtain a mixed solution. The mixed solution flowed in the form of overflow and underflow in the direction of second zone→third zone→fourth zone→product collection zone. A 5 mol/L nitric acid solution was added into the second zone (polymerization zone) to control the solution pH at this zone to be 4.8. A 5 mol/L nitric acid solution was added into the third zone to control the solution pH at this zone to be 2.8. A 5 mol/L nitric acid solution was added into the fourth zone to control the solution pH at this zone to be 1.2. The solution at the fourth zone flowed through a fifth zone and a sixth zone (without pH adjustment back at the fifth zone and the sixth zone) and then entered the product collection zone. The resultant solution flowed into the product collection zone, and the proportion of the solution refluxed from the product collection zone to the third zone was controlled to be 10%. The remaining solution was pumped from the top and then filtered to obtain β-ammonium tetramolybdate crystals. The temperature of the whole system was controlled to be 80° C., the total residence time was 5 h, and the crystallinity was 88.4%. The obtained ammonium tetramolybdate crystal sample was analyzed and detected to obtain the XRD pattern and SEM image shown in FIG. 7 and FIGS. 8A-8B, respectively.

Figure 7:
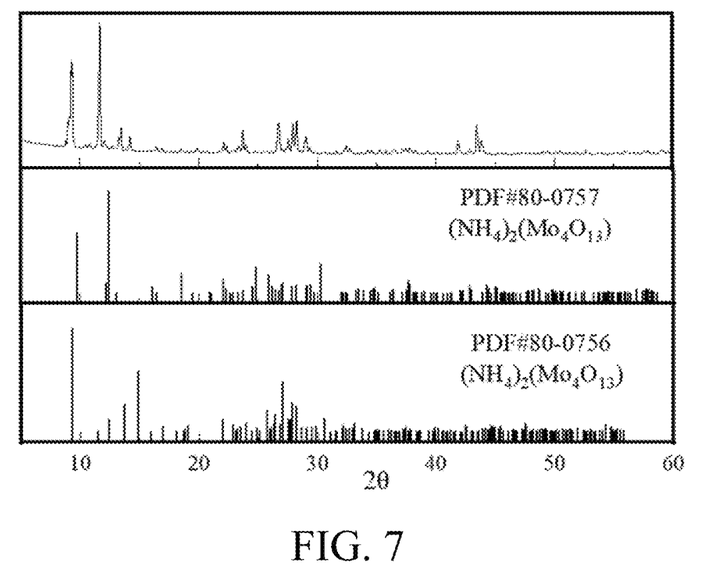
FIG. 7 is an XRD pattern of crystals prepared in Comparative Example 3.
Figure 8A:
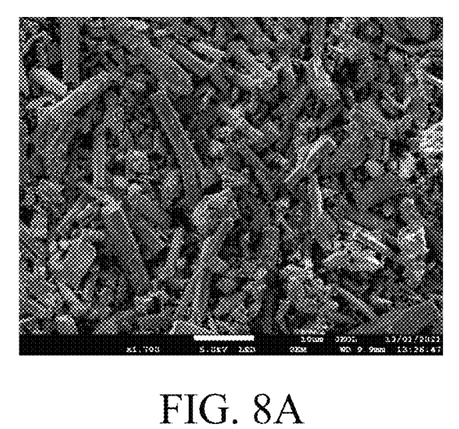
FIGS. 8A-8B are SEM patterns of crystals prepared in Comparative Example 3.
Figure 8B:
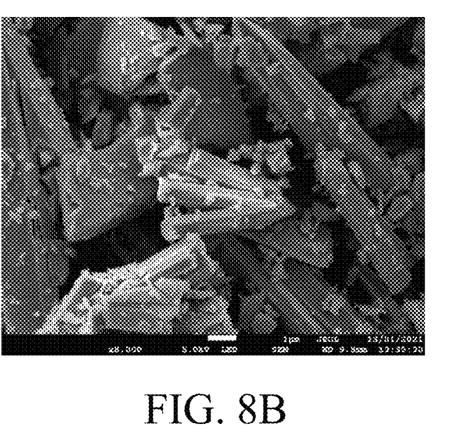

FIG. 7 is an XRD pattern. It can be seen from the XRD pattern that the product mainly contains most a-ammonium tetramolybdate and β-ammonium molybdate. By analysis, α-ammonium tetramolybdate accounts for about 36.8%, and β-ammonium molybdate accounts for 63.2%. FIGS. 8A-8B are SEM images of the crystallized product. It can be seen from this figure that the product is formed by long-strip particles with a large amount of fine particles attached to their surfaces, because the product does not undergo the fine grain redissolving stage, and the particle size is distributed widely.

What is claimed is:

1. A method for a crystallization of β-ammonium tetramolybdate, comprising: performing a stepwise pH-adjusting treatment of an ammonium molybdate solution via zoning, wherein upon feeding the ammonium molybdate solution into a reaction system from a first zone, $pH^1$ of a resultant solution in the first zone is adjusted to 7.0-6.0, prior to discharge into a second zone; $pH^2$ of a resultant solution in the second zone is adjusted to be less than 6 and greater than or equal to 4, prior to discharge into a third zone; $pH^3$ of a resultant solution in the third zone is adjusted to be less than 4 and greater than or equal to 2.5, prior to discharge into a fourth zone; $pH^4$ of a crystallized slurry in the fourth zone is adjusted to be less than 2.5 and greater than or equal to 1, prior to discharge into a fifth zone; $pH^5$ of a crystallized slurry in the fifth zone is adjusted to 2.5-4.0, prior to discharge into a sixth zone; and $pH^6$ of a crystallized slurry in the sixth zone is adjusted to be less than 2.5 and greater than or equal to 2.0, prior to reflux of a portion of the crystallized slurry in the sixth zone to the third zone, with a remaining of the crystallized slurry in the sixth zone being fed into a product zone for a solid-liquid separation, to obtain the β-ammonium tetramolybdate.

2. The method for the crystallization of the β-ammonium tetramolybdate according to claim 1, wherein $pH^1$ is 6-7;
    $pH^2$ is 4.0-5.9;
    $pH^3$ is 2.5-3.9;
    $pH^4$ is 1.0-2.4;
    $pH^5$ is 2.5-4.0; and
    $pH^6$ is 2.0-2.4.

3. The method for the crystallization of the β-ammonium tetramolybdate according to claim 2, wherein $pH^3$ is 3-3.9;
    $pH^4$ is 1.5-2.4; and
    $pH^5$ is 3.8-4.0.

4. The method for the crystallization of the β-ammonium tetramolybdate according to claim 1, wherein a concentration of the ammonium molybdate solution is 50-200 g/L.

5. The method for the crystallization of the β-ammonium tetramolybdate according to claim 1, wherein an acid used in a pH adjustment at each zone is at least one of an aqueous hydrochloric acid and an aqueous nitric acid.

6. The method for the crystallization of the β-ammonium tetramolybdate according to claim 5, wherein a concentration of the acid used in the pH adjustment at each zone is 5-10 mol/L.

7. The method for the crystallization of the β-ammonium tetramolybdate according to claim 1, wherein an alkali used in a pH adjustment is an aqueous ammonia.

8. The method for the crystallization of the β-ammonium tetramolybdate according to claim 1, wherein a temperature of the resultant solution during a treatment at each of the first zone, the second zone, and the third zone is 60-90° C.

9. The method for the crystallization of the β-ammonium tetramolybdate according to claim 1, wherein a total residence time of the ammonium molybdate solution is 2-6 h.

10. The method for the crystallization of the β-ammonium tetramolybdate according to claim 1, wherein a reflux ratio is 5-20 v %.

11. The method for the crystallization of the β-ammonium tetramolybdate according to claim 1, wherein the ammonium molybdate solution is continuously added to the first zone and is continuously subjected to the stepwise pH-adjusting treatment via zoning to continuously provide the β-ammonium tetramolybdate at the product zone.

12. The method for the crystallization of the β-ammonium tetramolybdate according to claim 2, wherein the ammonium molybdate solution is continuously added to the first zone and is continuously subjected to the stepwise pH-adjusting treatment via zoning to continuously provide the β-ammonium tetramolybdate at the product zone.

13. The method for the crystallization of the β-ammonium tetramolybdate according to claim 3, wherein the ammonium molybdate solution is continuously added to the first zone and is continuously subjected to the stepwise pH-adjusting treatment via zoning to continuously provide the β-ammonium tetramolybdate at the product zone.

14. The method for the crystallization of the β-ammonium tetramolybdate according to claim 4, wherein the ammonium molybdate solution is continuously added to the first zone and is continuously subjected to the stepwise pH-adjusting treatment via zoning to continuously provide the β-ammonium tetramolybdate at the product zone.

15. The method for the crystallization of the β-ammonium tetramolybdate according to claim 5, wherein the ammonium molybdate solution is continuously added to the first zone and is continuously subjected to the stepwise pH-adjusting treatment via zoning to continuously provide the β-ammonium tetramolybdate at the product zone.

16. The method for the crystallization of the β-ammonium tetramolybdate according to claim 6, wherein the ammonium molybdate solution is continuously added to the first zone and is continuously subjected to the stepwise pH-adjusting treatment via zoning to continuously provide the β-ammonium tetramolybdate at the product zone.

17. The method for the crystallization of the β-ammonium tetramolybdate according to claim 7, wherein the ammonium molybdate solution is continuously added to the first zone and is continuously subjected to the stepwise pH-adjusting treatment via zoning to continuously provide the β-ammonium tetramolybdate at the product zone.

18. The method for the crystallization of the β-ammonium tetramolybdate according to claim 8, wherein the ammonium molybdate solution is continuously added to the first zone and is continuously subjected to the stepwise pH-adjusting treatment via zoning to continuously provide the β-ammonium tetramolybdate at the product zone.

19. The method for the crystallization of the β-ammonium tetramolybdate according to claim 9, wherein the ammonium molybdate solution is continuously added to the first zone and is continuously subjected to the stepwise pH-adjusting treatment via zoning to continuously provide the β-ammonium tetramolybdate at the product zone.

20. The method for the crystallization of the β-ammonium tetramolybdate according to claim 10, wherein the ammonium molybdate solution is continuously added to the first zone and is continuously subjected to the stepwise pH-adjusting treatment via zoning to continuously provide the β-ammonium tetramolybdate at the product zone.

\* \* \* \* \*